(12) United States Patent
Tobinaga

(10) Patent No.: US 9,086,758 B2
(45) Date of Patent: Jul. 21, 2015

(54) DISPLAY INPUT DEVICE AND IMAGE FORMING APPARATUS

(71) Applicant: KYOCERA DOCUMENT SOLUTIONS INC., Osaka (JP)

(72) Inventor: Masayuki Tobinaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 121 days.

(21) Appl. No.: 13/899,819

(22) Filed: May 22, 2013

(65) Prior Publication Data

US 2013/0314350 A1 Nov. 28, 2013

(30) Foreign Application Priority Data

May 25, 2012 (JP) .................. 2012-119510

(51) Int. Cl.
*G06F 3/041* (2006.01)
*G03G 15/00* (2006.01)

(52) U.S. Cl.
CPC ............ *G06F 3/0416* (2013.01); *G03G 15/502* (2013.01)

(58) Field of Classification Search
CPC .... G03G 15/502; G06F 3/0416; G06F 3/0488
USPC ........................................ 345/173
See application file for complete search history.

(56) References Cited

U.S. PATENT DOCUMENTS

| | | | |
|---|---|---|---|
| 5,553,225 A | 9/1996 | Perry | |
| 7,469,381 B2 * | 12/2008 | Ording | ........................ 715/702 |
| 2008/0134078 A1 | 6/2008 | Han | |

FOREIGN PATENT DOCUMENTS

| | | |
|---|---|---|
| JP | H08-212045 A | 8/1996 |
| JP | 11-143301 A | 5/1999 |
| JP | 2005-182125 A | 7/2005 |
| JP | 2008-176548 A | 7/2008 |
| WO | 2010-107661 A1 | 9/2010 |

OTHER PUBLICATIONS

English language Abstract and Machine Translation for JP 2008-176548 A, published Jul. 31, 2008.
English language Abstract and Machine Translation for JP 2005-182125 A, published Jul. 7, 2005.
English language Abstract for JP H08-212045 A, published Aug. 20, 1996.
English Abstract and Translation for JP 11-143301 A, published May 28, 1999.

* cited by examiner

*Primary Examiner* — Viet Pham
(74) *Attorney, Agent, or Firm* — NDQ&M Watchstone LLP

(57) ABSTRACT

While a display portion displays a list, a scroll operation that is an operation of moving a touch position after the touch of a touch panel portion and of thereafter cancelling the touch of the touch panel portion is performed such that the touch panel portion receives an instruction to scroll the list, and, when the scroll operation is performed on the touch panel portion, the display portion changes a scroll width at which the list is scrolled according to a scroll operation direction that is a direction in which the touch position is moved at the time of the scroll operation.

8 Claims, 13 Drawing Sheets

DISPLAY INPUT DEVICE AND IMAGE FORMING APPARATUS

This application is based on and claims the benefit of priority from Japanese Patent Application No. 2012-119510 filed on May 25, 2012, the contents of which are hereby incorporated by reference.

BACKGROUND

The present disclosure relates to a display input device and an image forming apparatus.

Conventionally, an image forming apparatus (multifunctional machine) is known that has not only a copying function, a scan function, a fax function and the like but also a box function. The box function refers to a function of storing image data in a storage region called a box previously registered and of printing an image based on the stored image data. The image forming apparatus generally includes a display input device for receiving an instruction to select a function, an instruction to set a function and the like.

In the display input device of the image forming apparatus, not only hard keys and the like but also a display portion including a touch panel may be provided. In the display input device described above, soft keys for receiving various types of instructions are displayed on the display portion, and the soft key that is touched through the touch panel is detected based on an output of the touch panel.

For example, when the box function is selected by a user as a function to be used, the display input device displays a list in which items of information on the image data stored in an already registered box are arranged, and receives, from the user, an instruction to specify the desired image data. For example, when the user specifies the desired image data, the user touches the display position of information on the desired image data through the touch panel. Thus, the display input device determines that the image data corresponding to the information displayed in the touch position is specified by the user.

Incidentally, the number of items of information that can be arranged in the display range of the list at a time is limited. Hence, when items of information that cannot be arranged in the display range of the list at a time are present as display targets of the list, it is necessary to scroll the list to switch the display range of the list. Hence, a hard key for switching the display range of the list may be separately provided in the display input device. Alternatively, a soft key for switching the display range of the list may be displayed together with the list. Thus, the user performs a scroll operation (an operation of pressing down the hard key for switching the display range of the list or an operation of touching the display portion of the soft key for switching the display range of the list), and thereby can scroll the list.

While the list is displayed, when the display input device receives the scroll operation, the display input device scrolls the list at a previously determined scroll width. For example, each time the display input device receives the scroll operation, the display input device displaces the display range of the list by one page.

Here, when a significantly large amount of information is present as display targets, the number of pages of the list is increased accordingly. In this case, since the user may need to repeat the scroll operation until the desired information is displayed in the list, this is bothersome and inconvenient for the user.

SUMMARY

The present disclosure is made to solve the foregoing problem; an object of the present disclosure is to provide a display input device and an image forming apparatus that can enhance the convenience of a user who performs a scroll operation on a list displayed on a display portion.

To achieve the above object, a display input device according to the present disclosure includes a display portion and a touch panel portion. The display portion displays a list. The touch panel portion is provided in the display portion and detects a touch position touched by a user. While the display portion displays the list, a scroll operation that is an operation of moving the touch position after the touch of the touch panel portion and of thereafter cancelling the touch of the touch panel portion is performed such that the touch panel portion receives an instruction to scroll the list. When the scroll operation is performed on the touch panel portion, the display portion changes a scroll width at which the list is scrolled according to a scroll operation direction that is a direction in which the touch position is moved at the time of the scroll operation.

DETAILED DESCRIPTION (Overall Configuration of an Image Forming Apparatus)

A description will be given below using an example of an image forming apparatus (multifunctional machine) that can perform a plurality of types of functions such as a copying function, a transmission (scan) function, a fax function and a box function. The box function refers to a function of storing image data in a storage region (for example, a folder provided in a storage portion 113, which will be described later) called a box previously registered and of printing an image based on the stored image data.

Figure 1:
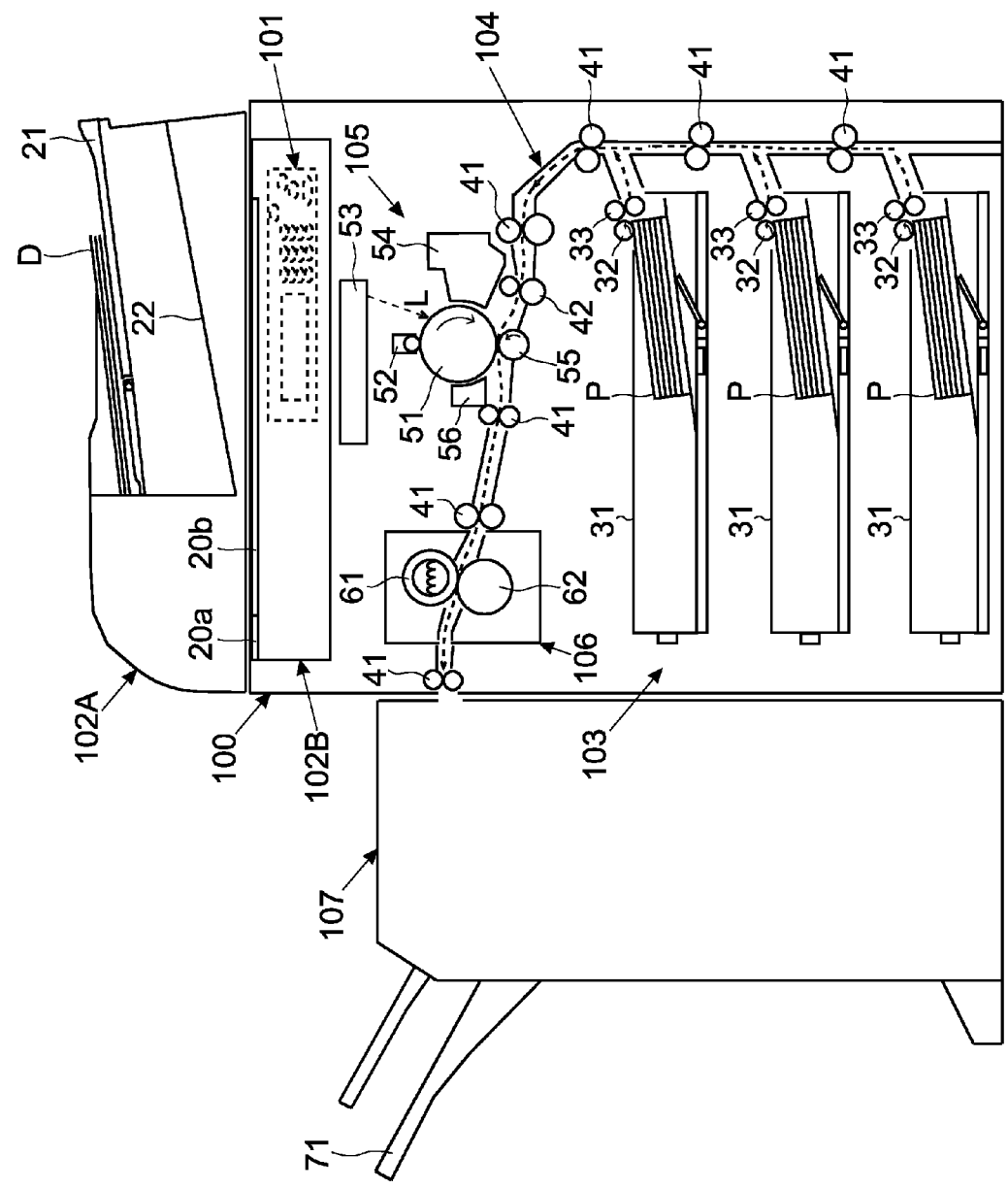
FIG. 1 is a schematic diagram of an image forming apparatus incorporating a display input device according to an embodiment of the present disclosure.

As shown in FIG. 1, the image forming apparatus 100 of the present embodiment includes an operation panel 101 (corresponding to a "display input device"), a document transport portion 102A, an image reading portion 102B, a paper feed portion 103, a sheet transport portion 104, an image formation portion 105, a fixing portion 106 and a post-processing portion 107.

Figure 2:
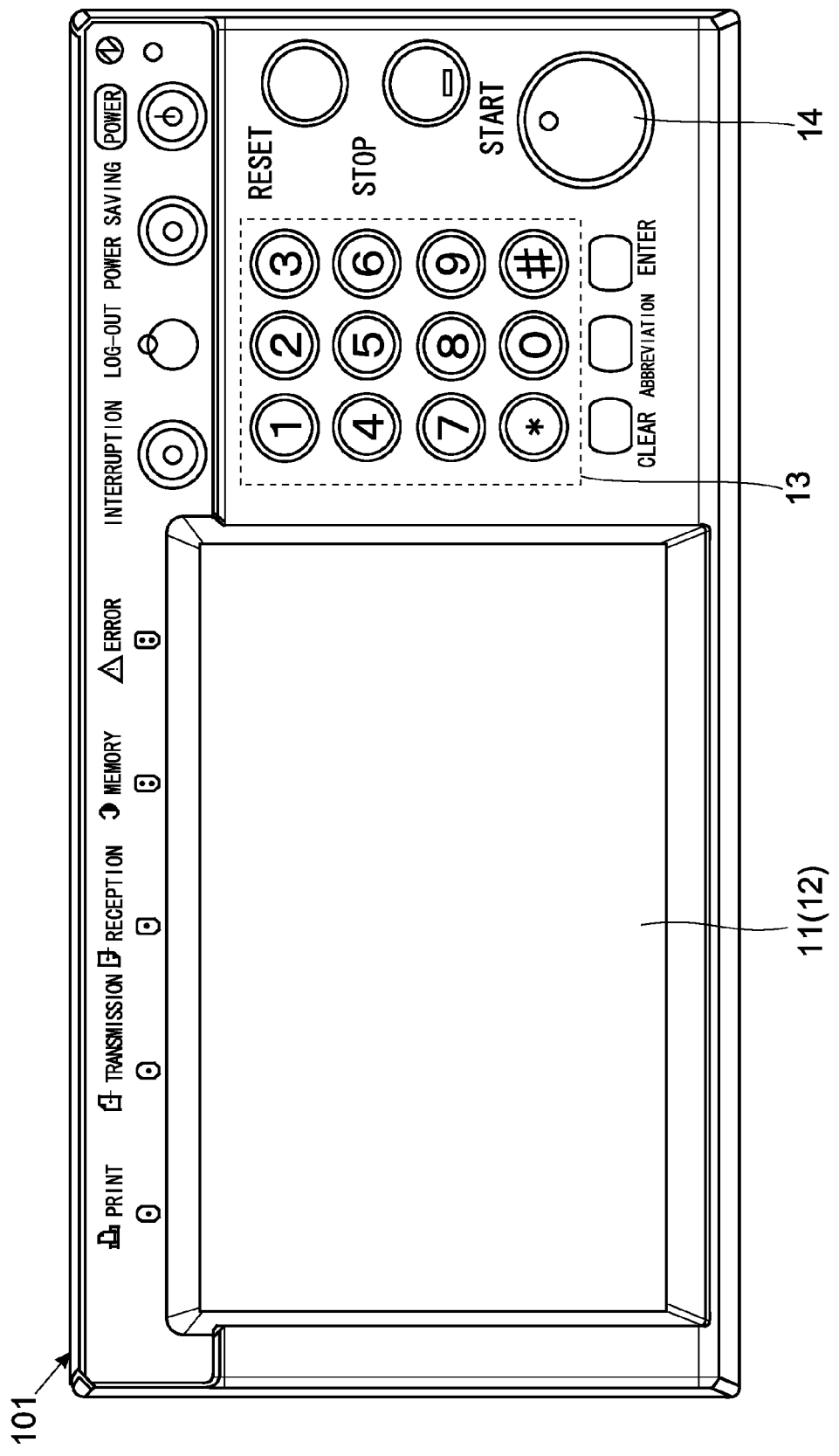
FIG. 2 is a detailed diagram of the display input device of the image forming apparatus shown in FIG. 1.

The operation panel 101 is arranged, for example, on the front surface side of the apparatus. This operation panel 101 includes, as shown in FIG. 2, a liquid crystal display portion 12 (corresponding to a "display portion") having a touch panel portion 11 on the display surface. The touch panel portion 11 is a multi-touch panel that can simultaneously detect a plurality of touch positions touched by a user. The liquid crystal display portion 12 displays a screen on which soft keys for receiving an input operation from the user, messages and the like are arranged. The screen displayed on the liquid crystal display portion 12 will be described in details later. The touch panel portion 11 covering the display surface of the liquid crystal display portion 12 is provided to detect a soft key (soft key touched through the touch panel portion 11 by the user) specified by the user. On the operation panel 101, as hard keys, a numeric keypad 13 for receiving the input of a value, a start key 14 for receiving an instruction to start the performance of a function and the like are provided.

With reference back to FIG. 1, the document transport portion 102A is attached such that it can be opened and closed about a rotational axis (not shown) provided on the apparatus back surface side of the image reading portion 102B. This document transport portion 102A feeds, one-by-one, documents D set in a document set tray 21, sends it to an upper portion of a transport reading contact glass 20a and ejects it to a document ejection tray 22. The document transport portion 102A also has the function of pressing the documents D placed on a placement reading contact glass 20b.

The image reading portion 102B reads the document D to generate image data. Although they are not illustrated, the image reading portion 102B includes optical members such as an exposure lamp, a mirror, a lens and an image sensor. The image reading portion 102B applies light to the document D passing through the transport reading contact glass 20a or the document D placed on the placement reading contact glass 20b, subjects an output value of the image sensor receiving light reflected off the document D to A/D conversion and thereby generates the image data. Thus, it is possible to print an image based on the image data obtained by performing an operation (scan) of reading the document D with the image reading portion 102B. It is also possible to store the image data obtained by the scanning.

The paper feed portion 103 includes a plurality of cassettes 31 holding sheets P, and feeds the sheets P held in the cassettes 31 to the sheet transport portion 104. In the paper feed portion 103, a pickup roller 32 for picking up the sheet P held and a separation roller pair 33 for reducing the simultaneous feeding of multiple sheets P are provided.

The sheet transport portion 104 transports the sheet P within the image forming apparatus 100. Specifically, the sheet P fed from the paper feed portion 103 passes through the image formation portion 105 and the fixing portion 106 in this order by being transported by the sheet transport portion 104. In the sheet transport portion 104, a plurality of transport roller pairs 41 for transporting the sheet P are provided. Furthermore, a resist roller pair 42 that places the sheet P on standby in front of the image formation portion 105 and that feeds out the sheet P to the image formation portion 105 with appropriate timing is also provided.

The image formation portion 105 forms a toner image based on the image data, and transfers the toner image to the sheet P. The image formation portion 105 includes a photoconductive drum 51, a charging device 52, an exposure device 53, a development device 54, a transfer roller 55 and a cleaning device 56.

In a process of forming the toner image and a process of transferring the toner image, the photoconductive drum 51 is first driven and rotated, and the surface of the photoconductive drum 51 is charged with the charging device 52 so as to have a predetermined potential. The exposure device 53 outputs a light beam L based on the image data, and scans and exposes the surface of the photoconductive drum 51. Thus, an electrostatic latent image is formed on the surface of the photoconductive drum 51. The development device 54 feeds a toner to the electrostatic latent image formed on the surface of the photoconductive drum 51 and develops it.

The transfer roller 55 is pressed onto the surface of the photoconductive drum 51, and can thereby be rotated. Furthermore, a predetermined potential is applied to the transfer roller 55. In this state, the resist roller pair 42 makes the sheet P enter between the transfer roller 55 and the photoconductive drum 51 with appropriate timing. Thus, the toner image on the surface of the photoconductive drum 51 is transferred to the sheet P. Then, after the completion of the process of transferring the toner image, the cleaning device 56 removes the toner and the like left on the surface of the photoconductive drum 51.

The fixing portion 106 heats and pressurizes the toner image transferred to the sheet P, and thereby fixes it. The fixing portion 106 includes a fixing roller 61 incorporating a heat source, and a pressure roller 62 that is pressed onto the fixing roller 61. The sheet P transferred to the toner image passes between the fixing roller 61 and the pressure roller 62, and is thereby heated and pressurized. Thus, the toner image is fixed to the sheet P, and the printing is completed.

The post-processing portion 107 receives, from the fixing portion 106, the printed sheet P, and performs post-processing such as sorting processing, staple processing and punch processing. Then, after the post-processing portion 107 has performed the post-processing on the printed sheet P, the post-processing portion 107 ejects the sheet P into an ejection tray 71.

(Hardware Configuration of the Image Forming Apparatus)

Figure 3:
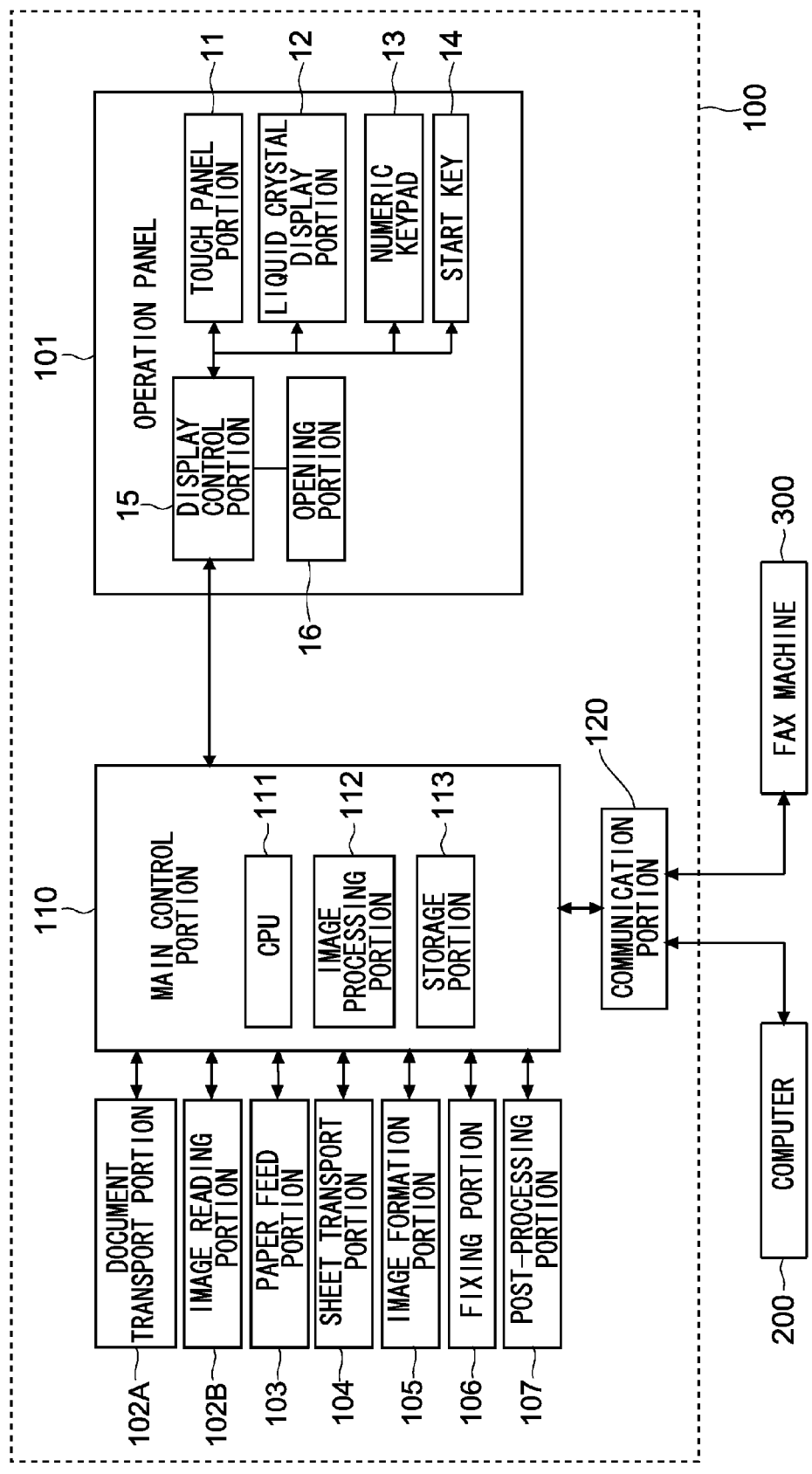
FIG. 3 is a block diagram showing the hardware configuration of the image forming apparatus shown in FIG. 1.

As shown in FIG. 3, the image forming apparatus 100 includes a main control portion 110. The main control portion 110 includes a CPU 111 that is a central processing unit, an image processing portion 112 and a storage portion 113. The image processing portion 112 is formed with an ASIC dedicated for image processing, a memory and the like, and performs various types of image processing (such as enlargement/reduction, density conversion and data format conversion) on the image data. The storage portion 113 is formed with a ROM, a RAM, a HDD and the like, and stores, in the ROM, programs and data necessary for performing the functions, and develops the programs and the data into the RAM.

The main control portion 110 is connected to the document transport portion 102A, the image reading portion 102B, the paper feed portion 103, the sheet transport portion 104, the image formation portion 105, the fixing portion 106, the post-processing portion 107 and the like. The main control portion 110 performs, based on the programs and the data stored in the storage portion 113, overall control, image processing control, drive control on a motor for rotating various types of rotary members and the like.

The operation panel 101 is also connected to the main control portion 110. The operation panel 101 includes a display control portion 15 (corresponding to a "processing portion") connected to the main control portion 110. The display control portion 15 is formed with a CPU or the like, and receives an instruction from the main control portion 110 to control the display operation of the operation panel 101. For example, when a soft key displayed on the liquid crystal display portion 12 is touched through the touch panel portion 11 by the user, the display control portion 15 detects the coordinates of the touch position based on the output of the touch panel portion 11. In other words, the display control portion 15 detects the soft key (soft key specified by the user) touched by the user through the touch panel portion 11. A storage portion 16 is connected to the display control portion 15. Data indicating a correspondence between the output of the touch panel portion 11 and the coordinates of the touch position is stored in the storage portion 16.

The main control portion 110 is also connected to a communication portion 120. The communication portion 120 is connected to, for example, an external computer 200 (such as a personal computer or a server) through a network such that the communication portion 120 can achieve communication. Thus, it is possible to print an image based on image data transmitted from the computer 200, and it is also possible to transmit the image data obtained by the scanning to the computer 200. Moreover, a modem or the like may be incorporated in the communication portion 120; in this case, it is possible to perform fax communication with an external fax machine 300 through a network such as a telephone line.

(Initial Screen Displayed on the Operation Panel)

Figure 4:
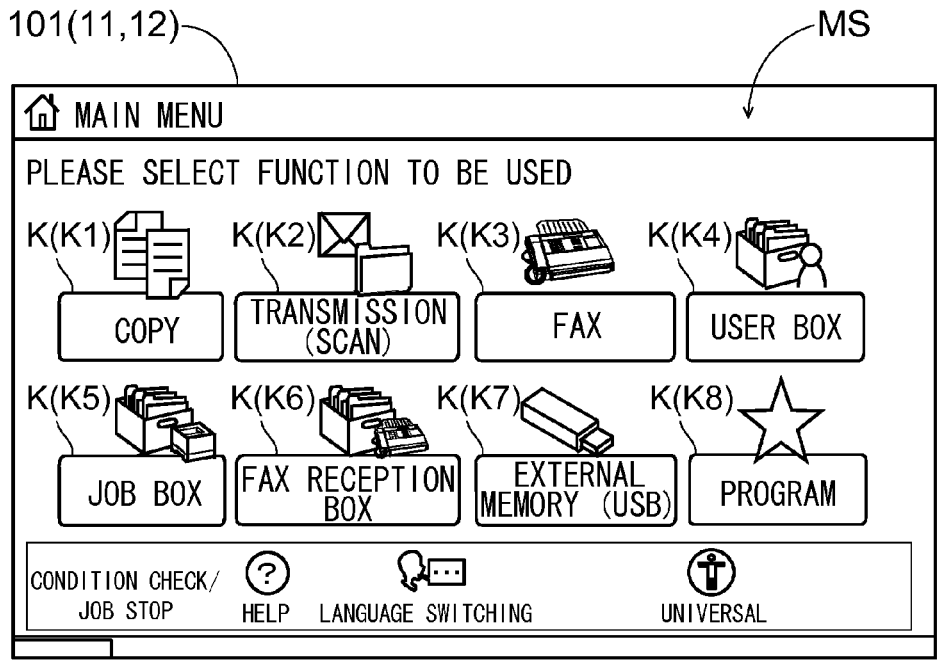
FIG. 4 is a diagram showing an example of a main menu screen displayed on the display input device of the image forming apparatus shown in FIG. 1.

When the main power is turned on, the operation panel 101 displays, as an initial screen, a main menu screen MS as shown in FIG. 4. In order to receive, from the user, an instruction to select a function to be used among a plurality of types of functions, a plurality of soft keys K corresponding to the functions are arranged on the main menu screen MS.

While the main menu screen MS described above is displayed, when the display position of any one of the soft keys K is touched through the touch panel portion 11 by the user, the operation panel 101 determines that the soft key K displayed in the touched position is specified by the user. For example, the user touches the display position of the desired soft key K and thereafter performs an operation (tap operation) of cancelling the touch, with the result that the user can specify the desired soft key K. Thereafter, the operation panel 101 displays a setting screen for receiving an instruction to set a function corresponding to the specified soft key K.

Figure 5:
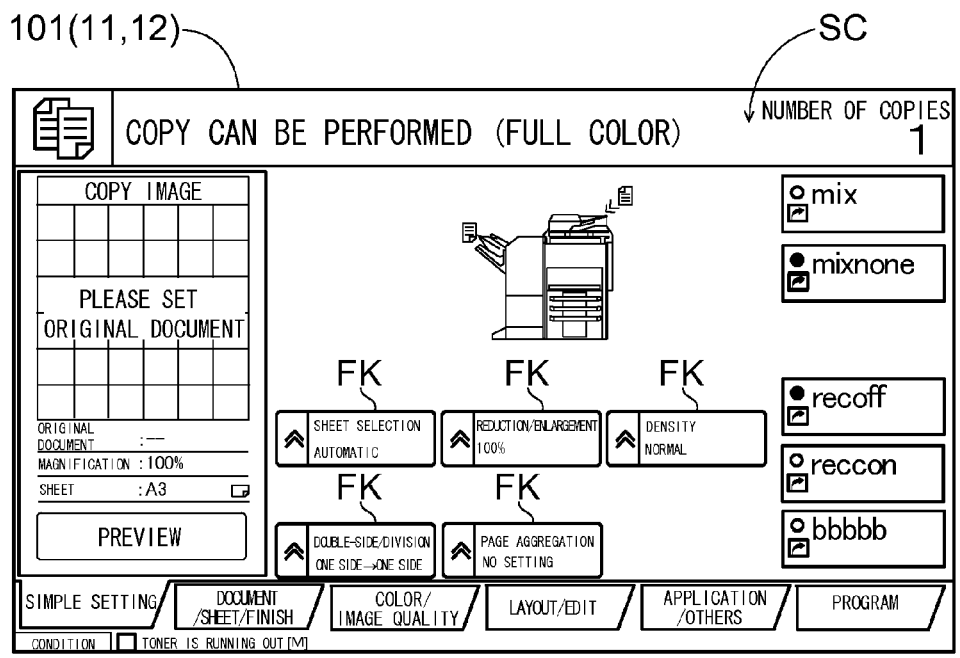
FIG. 5 is a diagram showing an example of a setting screen for a copying function displayed on the display input device of the image forming apparatus shown in FIG. 1.

Specifically, when the display position of a soft key K1 is touched (tapped) through the touch panel portion 11 by the user, the operation panel 101 displays, as shown in FIG. 5, a setting screen SC for receiving an instruction to set the copying function. On the setting screen SC for the copying function, a plurality of setting keys FK corresponding to a plurality of setting items on the copying function are arranged. FIG. 5 shows, as an example, the setting screen SC on which a plurality of setting keys FK corresponding to setting items of sheet selection, reduction/enlargement, density, double-side/division and page aggregation are arranged. In each of the setting keys FK, a setting value of the corresponding setting item at present is displayed. Then, when any one of the setting keys FK is touched and specified through the touch panel portion 11 by the user, the operation panel 101 displays a screen (not shown) for inputting the setting value of the setting item corresponding to the specified setting key FK. Thus, the user can recognize the setting value of each of the setting items on the copying function at present and also change the setting value.

With reference back to FIG. 4, when the display position of a soft key K2 is touched through the touch panel portion 11 by the user, the operation panel 101 displays a setting screen (not shown) for receiving an instruction to set the transmission (scan) function. On the setting screen for the transmission (scan) function, it is possible to set the transmission destination of data such as the image data obtained by the scanning. When the display position of a soft key K3 is touched through the touch panel portion 11 by the user, the operation panel 101 displays a setting screen (not shown) for receiving an instruction to set the fax function. On the setting screen for the fax function, it is possible to input a fax number.

When the display position of any one of soft keys K4 to K6 is touched through the touch panel portion 11 by the user, the operation panel 101 displays a setting screen SB (see FIG. 6) for receiving an instruction to set the box function. The setting screen SB for the box function will be described in details later.

Incidentally, among the box functions corresponding to the soft keys K4 to K6 on the main menu screen MS shown in FIG. 4, the box function corresponding to the soft key K4 is a function (user box function) of storing the image data obtained by the scanning and of printing an image based on the stored image data. The box function corresponding to the soft key K5 is a function (job box function) of transmitting the image data from the computer 200 to the image forming apparatus 100 and storing it and of printing an image based on the stored image data. The box function corresponding to the soft key K6 is a function (fax box function) of storing fax data received by the communication portion 120 and of printing an image based on the stored fax data.

When the display position of the soft key K7 is touched through the touch panel portion 11 by the user, the operation panel 101 displays a setting screen (not shown) for receiving an instruction to set a function utilizing an external memory. The function utilizing the external memory refers to a function of printing an image based on image data stored in the external memory and of storing the image data in the external memory.

The soft key K8 is a soft key K corresponding to a program function; when the display position of the soft key K8 is touched through the touch panel portion 11 by the user, the operation panel 101 displays a program selection screen (not shown) for receiving, from the user, an instruction to select a program to be read among the registered programs. Incidentally, the program function refers to a function of registering, as a program, one or more setting items (setting values) previously selected by the user among a plurality of setting items on the copying function, the transmission (scan) function and the like.

(Setting Screen for the Box Function)

Figure 6:
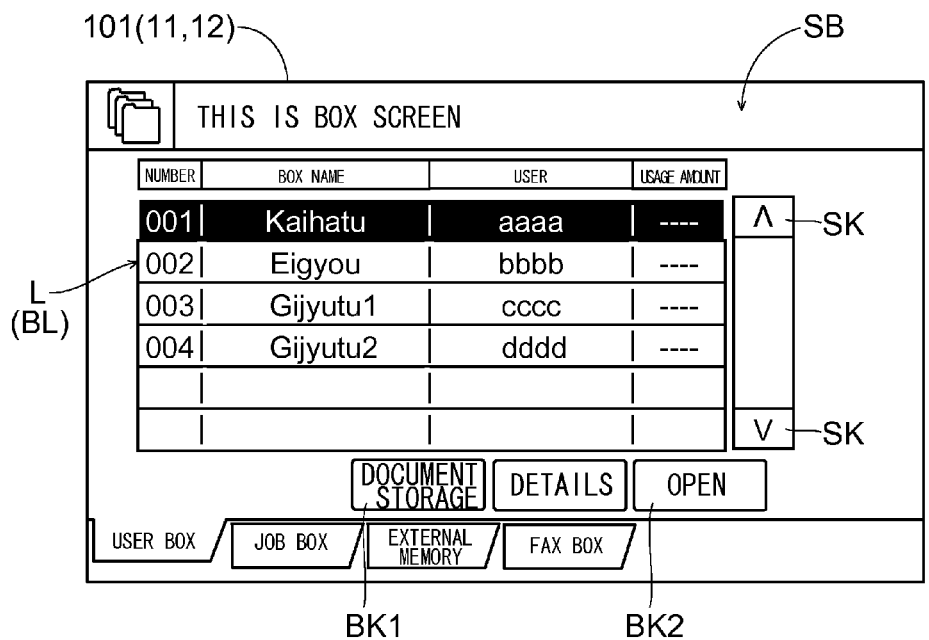
FIG. 6 is a diagram showing an example of a setting screen (screen on which a list where information on a box is a display target is provided) for a box function displayed on the display input device of the image forming apparatus shown in FIG. 1.

On the setting screen SB for the box function, as shown in FIG. 6, a list L (box list BL) is provided in which items of information (such as the name, the user and the amount of usage) on the registered boxes are arranged. For example, when the user desires to store, in the box, the image data obtained by the scanning, the user touches the display position of the information on the desired box through the touch panel portion 11, and thereby specifies the desired box (for example, an information column on the specified box is reversed in display color). Thereafter, the user touches the display position of a "document storage" key BK1 through the touch panel portion 11 and then performs scanning (presses down the start key 14), and thus it is possible to store, in the specified box, the image data obtained by the scanning.

Figure 7:
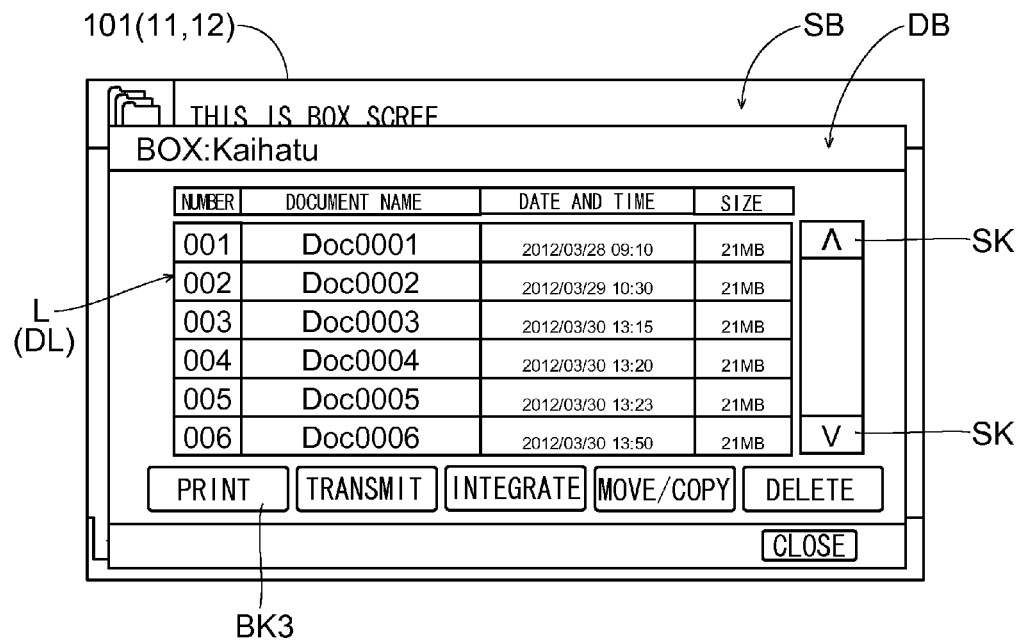
FIG. 7 is a diagram showing an example of a setting screen (screen on which a list where information on image data is a display target is provided) for the box function displayed on the display input device of the image forming apparatus shown in FIG. 1.

When the user desires to print an image based on the image data stored in the box, the user specifies the box where the desired image data is stored, and thereafter touches the display position of an "open" key BK2 through the touch panel portion 11. In this way, the operation panel 101 displays a dialogue box DB as shown in FIG. 7. In the dialogue box DB, a list L (data list DL) is provided in which items of information (such as the name, the date and time and the size) on the image data stored in the specified box. Then, the user touches the display position of the information on the desired image data through the touch panel portion 11, and thereby specifies the desired image data. Thereafter, the user touches the display position of a "print" key BK3 through the touch panel portion 11, and then performs printing (presses down the start key 14), and thus it is possible to print an image based on the specified image data.

(Scrolling of the List)

As shown in FIGS. 6 and 7, in the box list BL where the information on the box is the display target and the image data list DL where the information on the image data is the display target, it is possible to display six items of information in the display range of one page. However, seven or more items of information may be present as the display targets. In this case, in order to display information other than the six items of information displayed at present, it is necessary to switch the display range of the list L. Hence, in normal, a scroll key SK for scrolling (switching the display range of the list L) the list L is displayed together with the list L.

Figure 8:
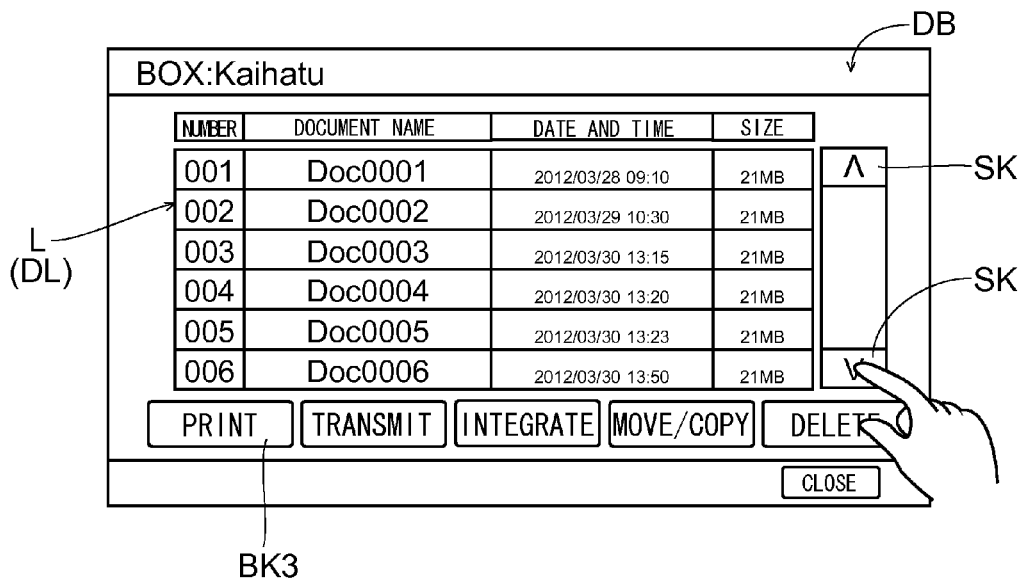
FIG. 8 is a diagram for illustrating an operation of scrolling the list in the display input device of the image forming apparatus shown in FIG. 1.
Figure 9:
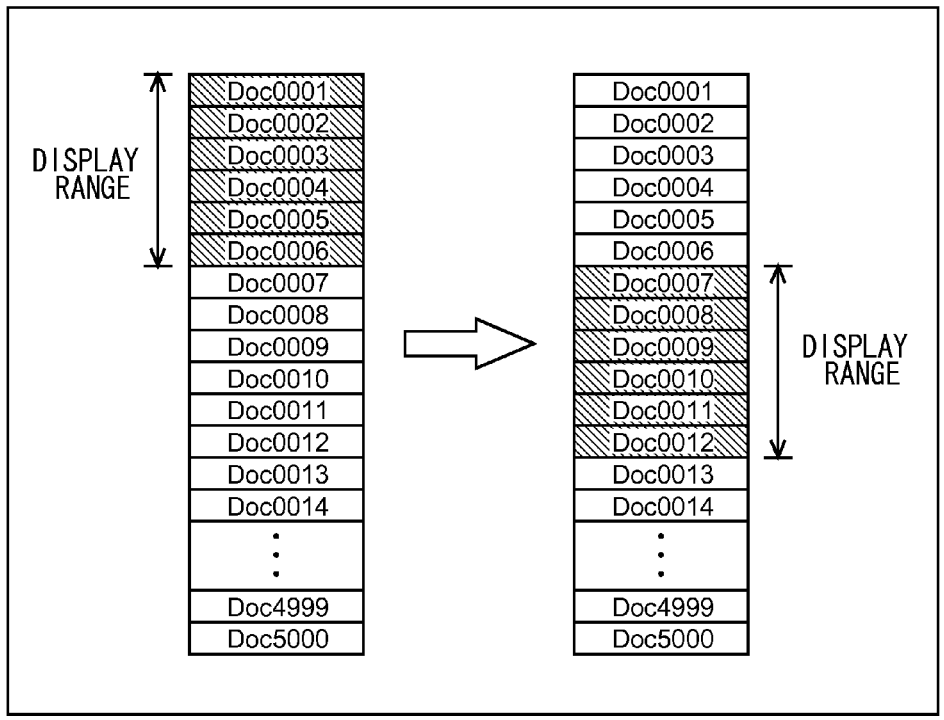
FIG. 9 is a diagram for illustrating a scroll width at which the operation shown in FIG. 8 is performed.

When an operation (see FIG. 8) of touching the display position of the scroll key SK is performed on the touch panel portion 11, the liquid crystal display portion 12 switches the display page of the list L from the current page to the subsequent page (or the preceding page). For example, when the operation of touching the display position of the scroll key SK once is performed on the touch panel portion 11, the liquid crystal display portion 12 displaces, as shown in FIG. 9, the list L by one page and displays it (displaces the display target by six items and displays it). In other words, each time the operation of touching the display position of the scroll key SK once is performed on the touch panel portion 11, the liquid crystal display portion 12 displaces the display page by one page. In FIG. 9, in order to distinguish between information that is actually displayed and information that is not displayed, the information that is actually displayed is hatched. The same is true for the drawings (FIGS. 12, 14, 16 and 18), which will be referenced in the following description.

Here, in the present embodiment, while the liquid crystal display portion 12 displays the list L, even when a scroll operation (for example, a touch operation (flick operation) in which the panel surface is flicked with a finger) that is an operation of moving the touch position after the touch and of thereafter cancelling the touch is performed on the touch panel portion 11, the list L is scrolled. However, when such a scroll operation is performed on the touch panel portion 11, a scroll width at which the list L is scrolled is changed according to a scroll operation direction that is a direction in which the touch position is moved at the time of the scroll operation. When the flick operation is performed in a previously determined position (scroll operation reception position), the touch panel portion 11 receives the flick operation as the scroll operation whereas, when the flick operation is performed in a position other than the scroll operation reception position, the touch panel portion 11 does not receive the flick operation as the scroll operation. In other words, when an operation is performed of moving the touch position after the touch of the touch panel portion 11 in the previously determined scroll operation reception position within the screen on which the list L is displayed and of thereafter cancelling the touch of the touch panel portion 11, the touch panel portion 11 receives such an operation as the scroll operation. On the other hand, when an operation is performed of moving the touch position after the touch of the touch panel portion 11 in a position other than the previously determined scroll operation reception position within the screen on which the list L is displayed and of thereafter cancelling the touch of the touch panel portion 11, the touch panel portion 11 does not receive such an operation as the scroll operation. For example, the scroll operation reception position is a position between a pair of scroll keys SK.

When the scroll operation is performed on the touch panel portion 11, the display control portion 15 determines a position (operation start position) that is first touched at the time of the scroll operation and a position (operation completion position) where the touch is cancelled. Thereafter, the display control portion 15 calculates an inclination angle of the scroll operation direction that is an angle (angle on the side of the acute angle) formed by a line (reference line) extending from the operation start position in a previously determined direction (vertical direction) and a line connecting the operation start position and the operation completion position. When the display control portion 15 calculates the inclination angle of the scroll operation direction, if the scroll operation direction is an upward direction (including a diagonally upward direction), a line extending vertically from the operation start position in the upward direction is assumed to be the reference line whereas, if the scroll operation direction is a downward direction (including a diagonally downward direction), a line extending vertically from the operation start position in the downward direction is assumed to be the reference line.

Then, when the scroll operation is performed on the touch panel portion 11, the liquid crystal display portion 12 changes the scroll width at which the list L is scrolled according to the magnitude of the inclination angle of the scroll operation direction calculated by the display control portion 15. Thus, it is possible to easily change the scroll width at which the list L is scrolled according to the magnitude of the inclination angle of the scroll operation direction. For example, when the scroll operation is performed on the touch panel portion 11, the liquid crystal display portion 12 scrolls the list L at the scroll width associated with an angle range including the inclination angle of the scroll operation direction among a plurality of angle ranges previously determined. If the scroll operation direction is a downward direction (including a diagonally downward direction), the list L is scrolled up whereas, if the scroll operation direction is an upward direction (including a diagonally upward direction), the list L is scrolled down.

Figure 10:
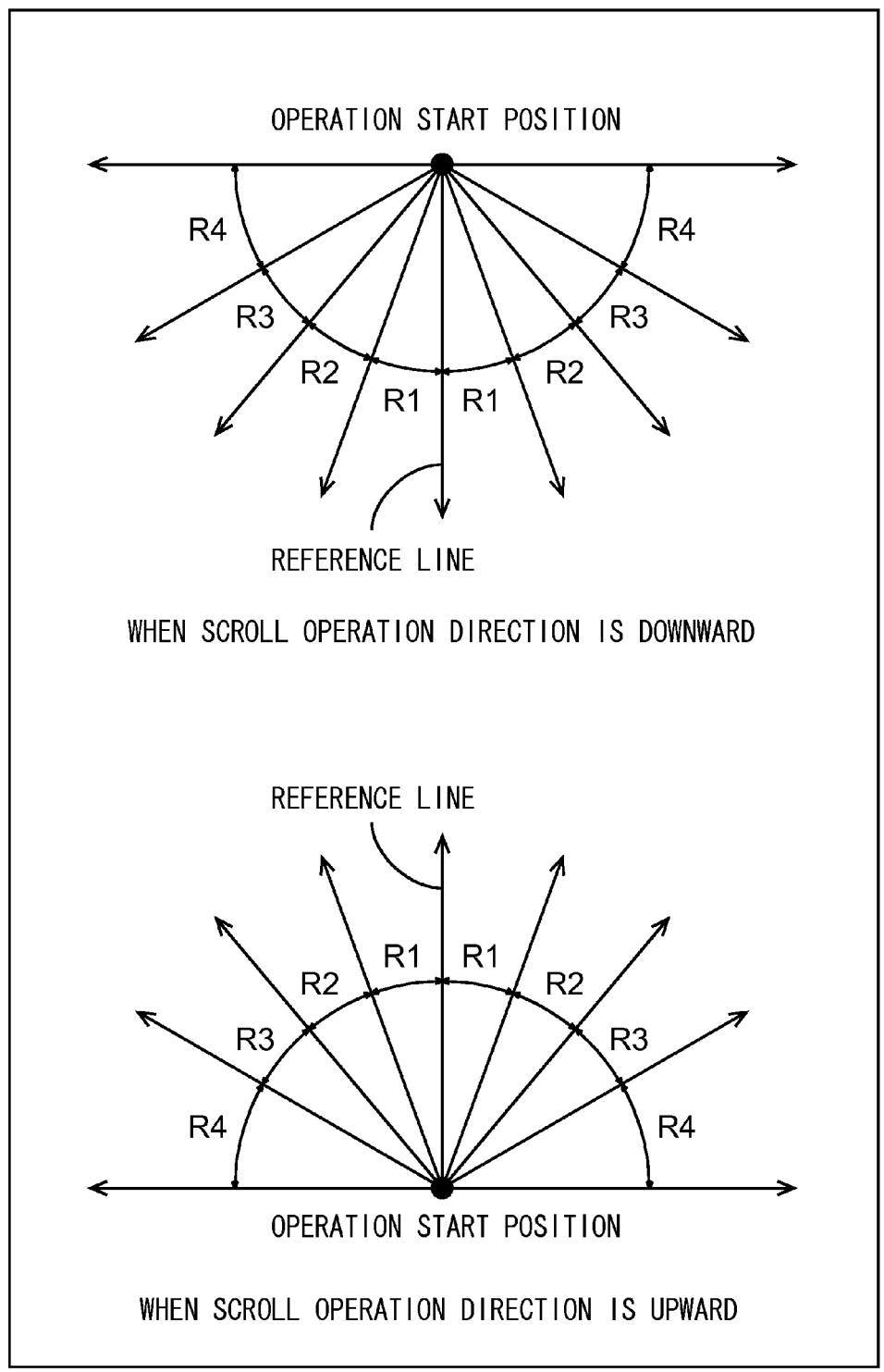
FIG. 10 is a diagram for illustrating a relationship between an inclination angle of a scroll operation direction and the scroll width in the display input device of the image forming apparatus shown in FIG. 1.

Incidentally, scroll information that associates the previously determined angle ranges and the scroll widths is previously stored in the storage portion 16. For example, in the scroll information, as shown in FIG. 10, different scroll widths are associated with four angle ranges R1 to R4 that are a first angle range R1 (less than 20 degrees), a second angle range R2 (equal to or more than 20 degrees but less than 40 degrees), a third angle range R3 (equal to or more than 40 degrees but less than 60 degrees) and a fourth angle range R4 (equal to or more than 60 degrees). The scroll widths associated with the first to fourth angle ranges R1 to R4 will be described using, as an example, a case where the scroll operation of moving the touch position from the operation start position in a downward direction (including a diagonally downward direction) is performed.

Figure 11:
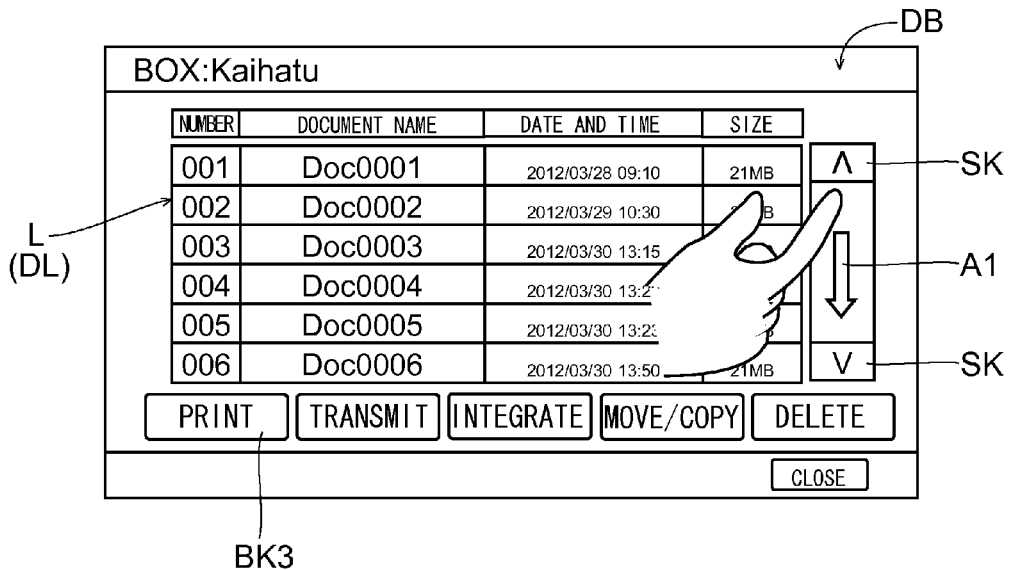
FIG. 11 is a diagram for illustrating an operation of scrolling the list in the display input device of the image forming apparatus shown in FIG. 1.
Figure 12:
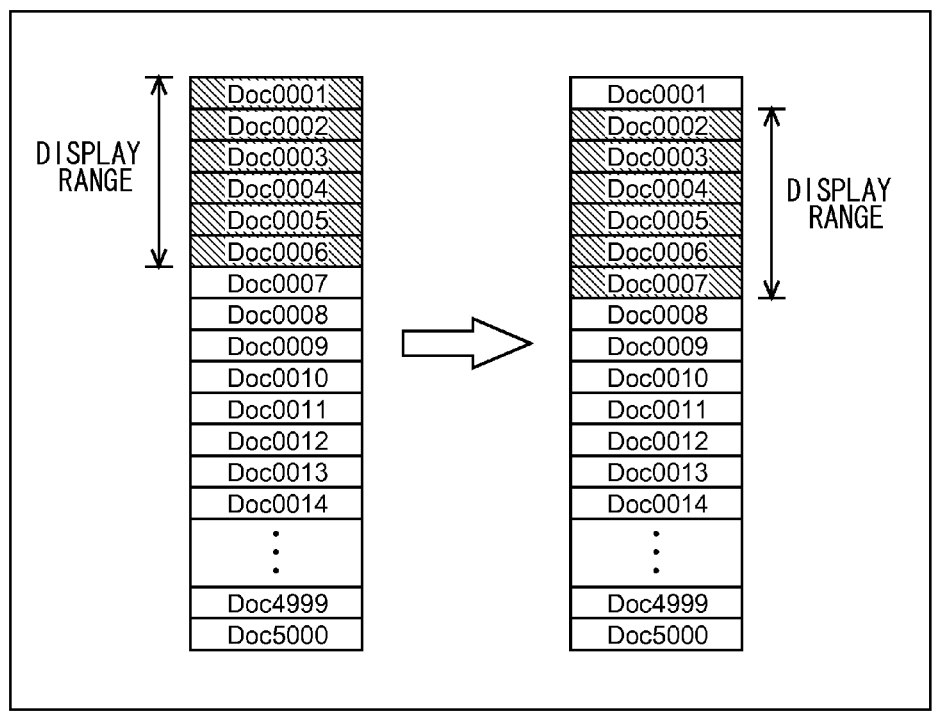
FIG. 12 is a diagram for illustrating the scroll width at which the operation shown in FIG. 11 is performed.
Figure 13:
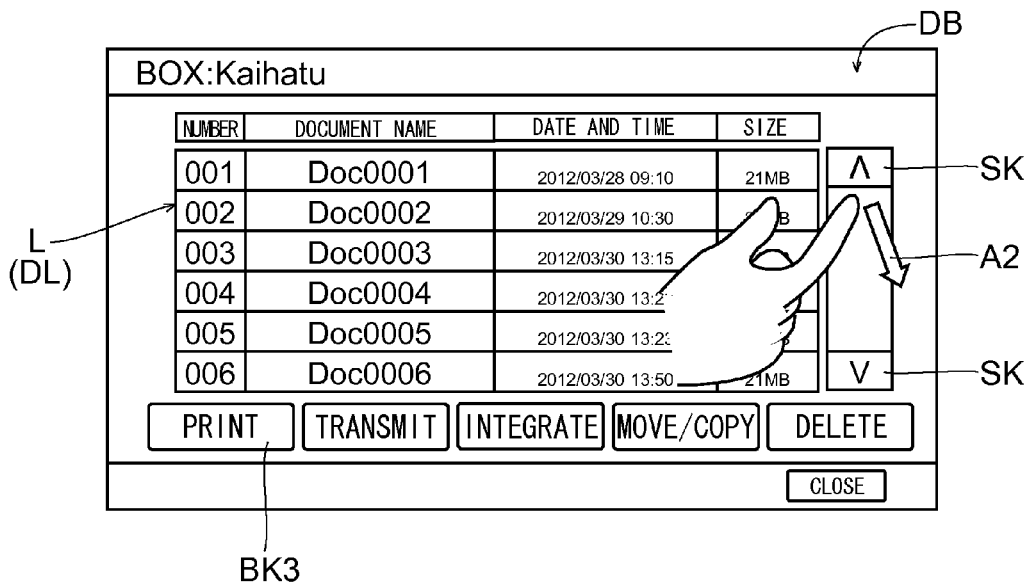
FIG. 13 is a diagram for illustrating an operation of scrolling the list in the display input device of the image forming apparatus shown in FIG. 1.
Figure 14:
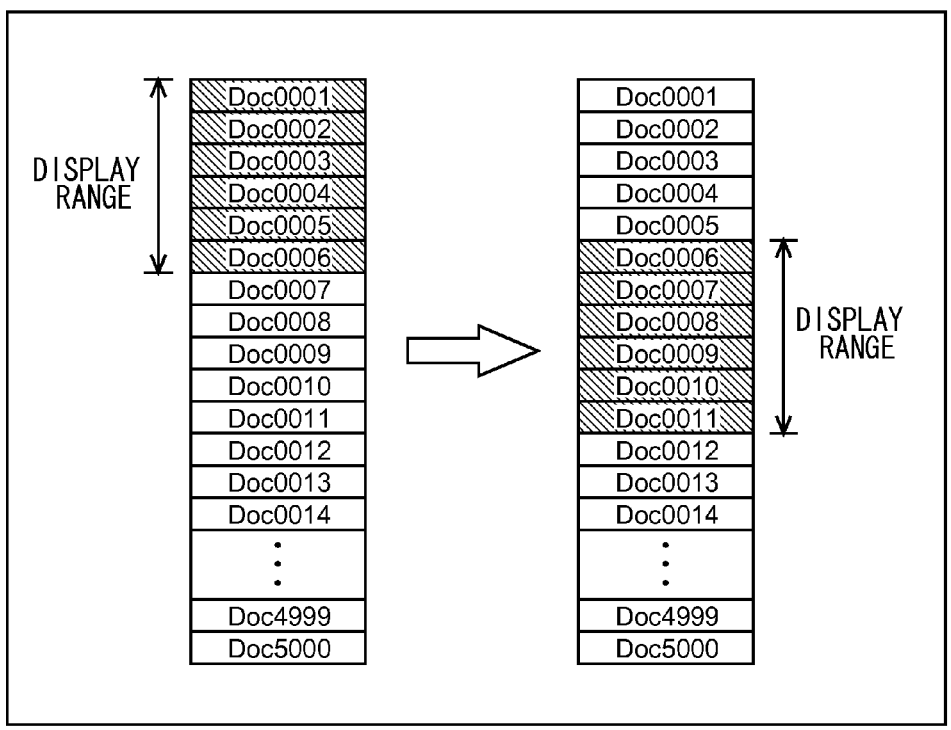
FIG. 14 is a diagram for illustrating the scroll width at which the operation shown in FIG. 13 is performed.
Figure 15:
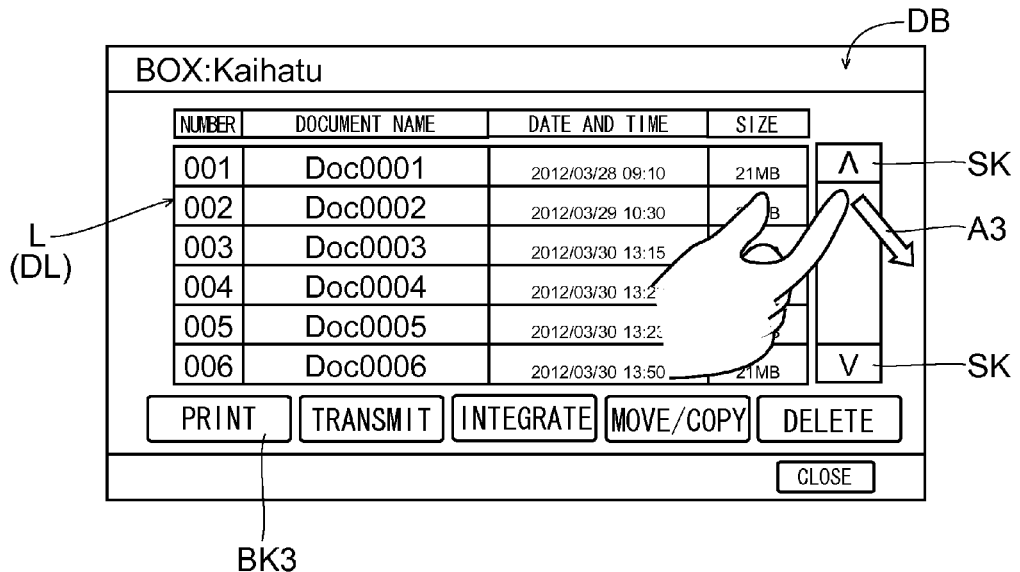
FIG. 15 is a diagram for illustrating an operation of scrolling the list in the display input device of the image forming apparatus shown in FIG. 1.
Figure 16:
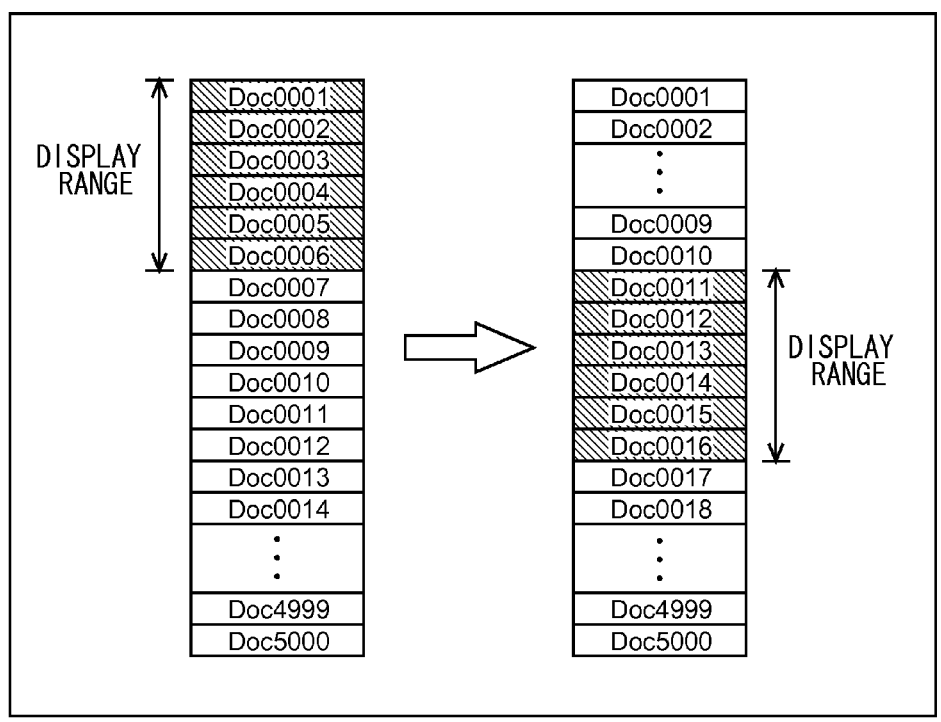
FIG. 16 is a diagram for illustrating the scroll width at which the operation shown in FIG. 15 is performed.
Figure 17:
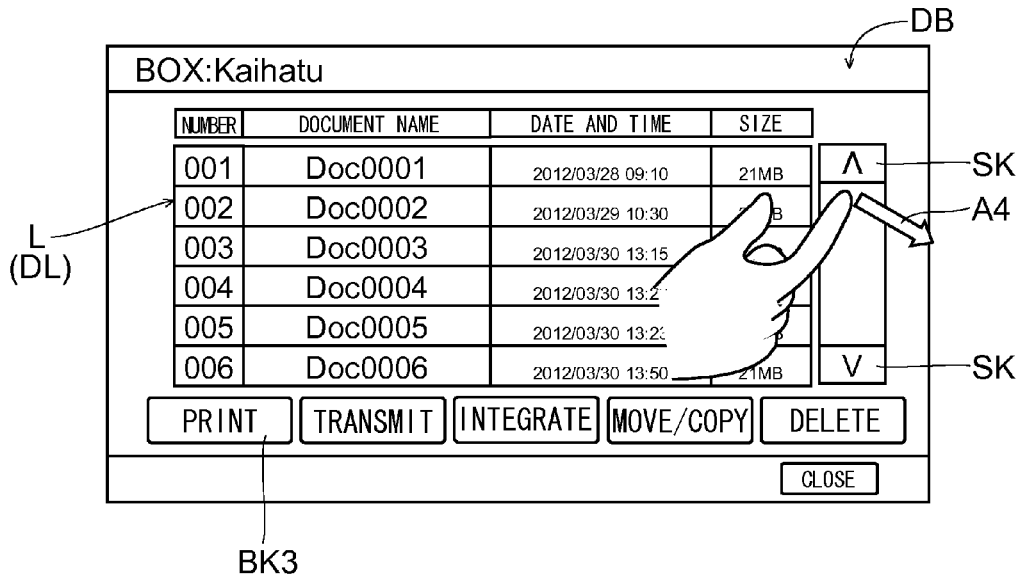
FIG. 17 is a diagram for illustrating an operation of scrolling the list in the display input device of the image forming apparatus shown in FIG. 1.
Figure 18:
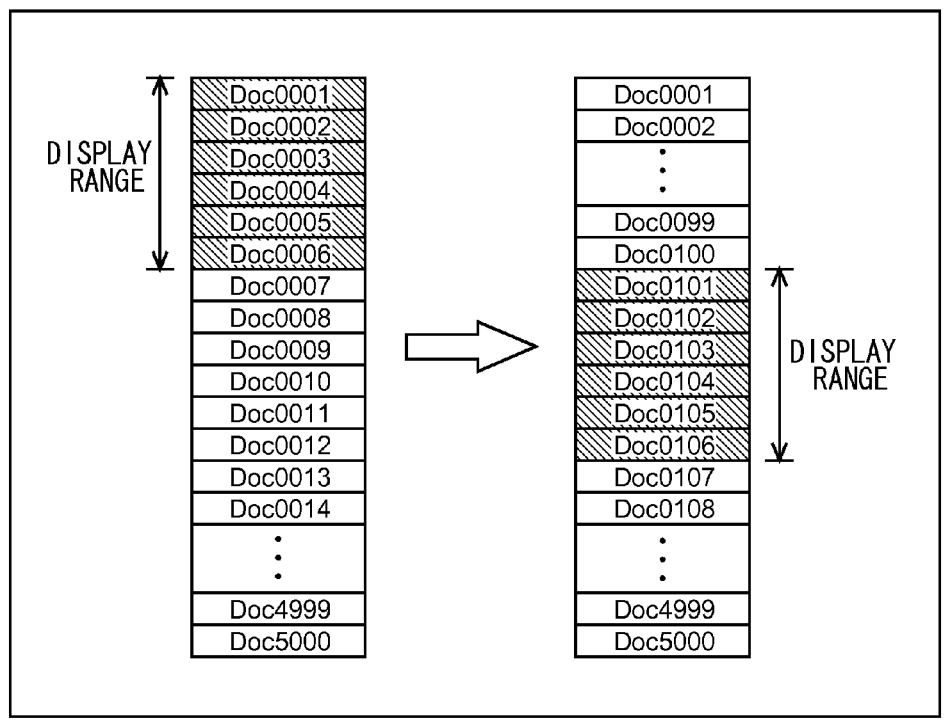
FIG. 18 is a diagram for illustrating the scroll width at which the operation shown in FIG. 17 is performed.

For example, as shown in FIG. 11, when the inclination angle of the scroll operation direction (direction indicated by an arrow A1) falls within the first angle range R1, the liquid crystal display portion 12 scrolls up the display target of the list L by one item (see FIG. 12). As shown in FIG. 13, when the inclination angle of the scroll operation direction (direction indicated by an arrow A2) falls within the second angle range R2, the liquid crystal display portion 12 scrolls up the display target of the list L by five items (see FIG. 14). As shown in FIG. 15, when the inclination angle of the scroll operation direction (direction indicated by an arrow A3) falls within the third angle range R3, the liquid crystal display portion 12 scrolls up the display target of the list L by ten items (see FIG. 16). As shown in FIG. 17, when the inclination angle of the scroll operation direction (direction indicated by an arrow A4) falls within the fourth angle range R4, the liquid crystal display portion 12 scrolls up the display target of the list L by a hundred items (see FIG. 18). In other words, as the inclination angle of the scroll operation direction is increased, the scroll widths associated with the first to fourth angle ranges R1 to R4 are determined such that the scroll width at which the list L is scrolled is increased.

The total number of display targets listed in the list L is determined, and the scroll widths associated with the first to fourth angle ranges R1 to R4 may be changed according to the total number of display targets listed in the list L. Thus, the convenience of the user is enhanced. In this case, for example, when the number of display targets listed in the list L is increased or decreased, the scroll widths associated with the first to fourth angle ranges R1 to R4 are calculated by the display control portion 15. For example, as the total number of display targets listed in the list L is greater, the scroll width at which the inclination angle of the scroll operation direction is great is increased. Then, when the scroll operation is performed on the touch panel portion 11, the liquid crystal display portion 12 scrolls the list L at the scroll width (scroll width calculated by the display control portion 15) associated with the angle range including the inclination angle of the scroll operation direction among the first to fourth angle ranges R1 to R4.

Figure 19:
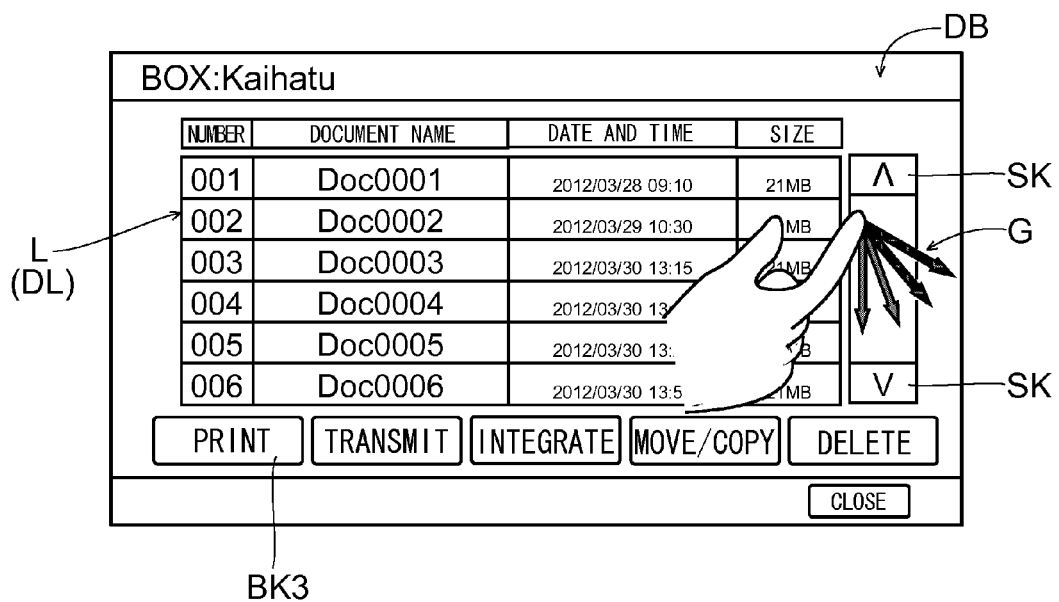
FIG. 19 is a diagram showing an example of a setting screen (screen on which guide information is provided together with the list) for the box function displayed in the display input device of the image forming apparatus shown in FIG. 1.

As shown in FIG. 19, guide information G which indicates the first to fourth angle ranges R1 to R4 such that they can be visually recognized may be displayed. For example, the guide information G is an arrow image. Thus, it is possible to enhance operability at the time of the scroll operation (it is easy to find in which direction the touch position is moved at the time of the scroll operation).

(Flow when the List is Scrolled)

A flow when the list L is scrolled will be described below with reference to a flowchart shown in FIG. 20.

Figure 20:
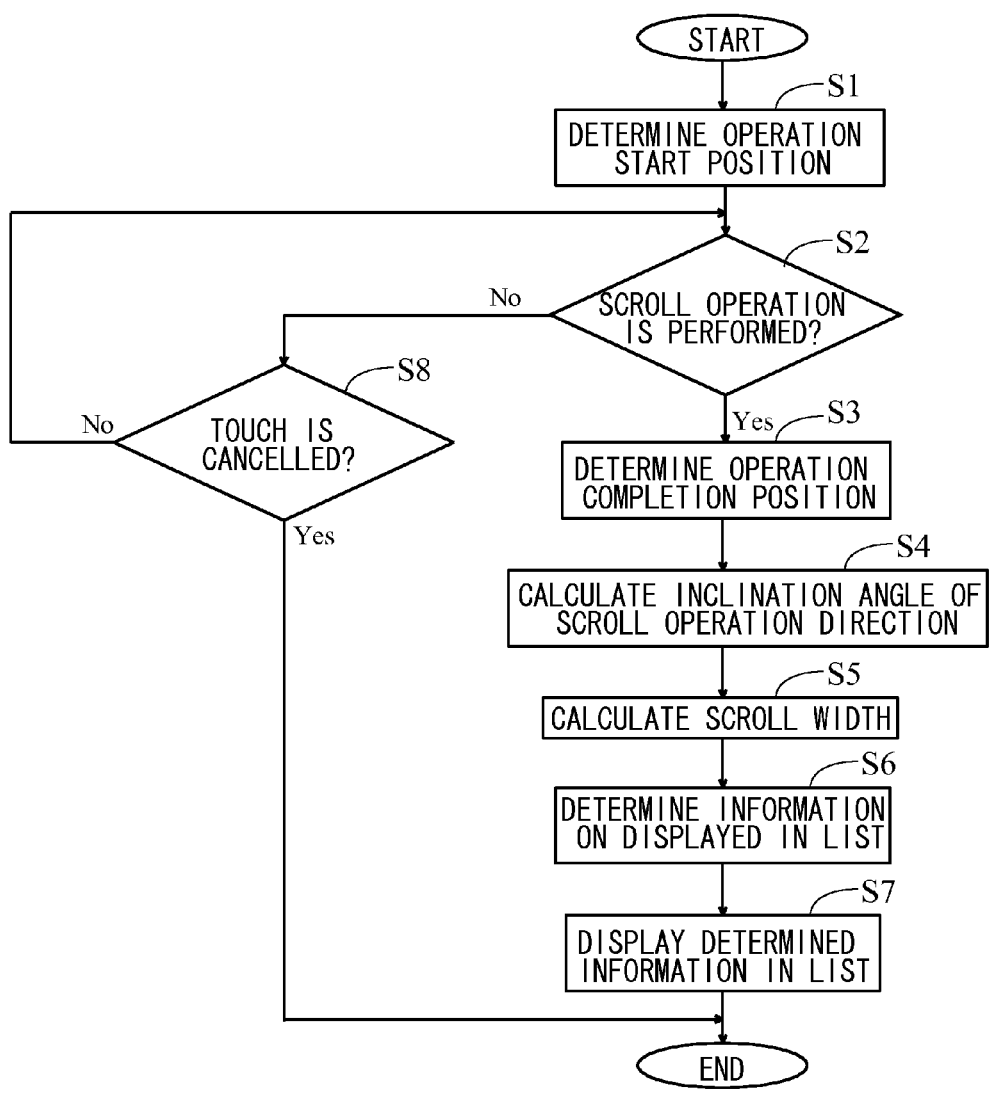
FIG. 20 is a flow chart for illustrating an operation of scrolling the list in the display input device of the image forming apparatus shown in FIG. 1.

First, at the start of the flowchart of FIG. 20, the liquid crystal display portion 12 is assumed to display the list L. Then, when the operation of touching the scroll operation reception position is performed on the touch panel portion 11, the flowchart of FIG. 20 is started.

In step S1, the display control portion 15 determines the touched position (operation start position). Here, the guide information G may be displayed.

In step S2, the display control portion 15 determines whether or not the operation (scroll operation) of moving the touch position after the touch and of cancelling the touch is performed on the touch panel portion 11. As a result of the determination, if the scroll operation is performed, the process moves to step S3.

When the process moves to step S3, the display control portion 15 determines the position (operation completion position) where the touch is cancelled. In step S4, the display control portion 15 calculates the inclination angle of the scroll operation direction that is an angle formed by a line extending from the operation start position in a previously determined direction and a line connecting the operation start position and the operation completion position.

In step S5, the display control portion 15 calculates the scroll width associated with the angle range including the inclination angle of the scroll operation direction among the previously determined angle ranges. In step S6, the display control portion 15 determines information that is displayed in the list L. In step S7, the display control portion 15 controls the display operation of the liquid crystal display portion 12, and displays the determined information in the list L. In other words, the liquid crystal display portion 12 scrolls the list L at the scroll width associated with the angle range including the inclination angle of the scroll operation direction among the previously determined angle ranges.

If, in step S2, the scroll operation is not performed, the process moves to step S8. When the process moves to step S8, the display control portion 15 determines whether or not the touch of the touch panel portion 11 is cancelled before the scroll operation is performed. As a result of the determination, if the touch is cancelled, the list L is not scrolled, and completion is made without any process being performed. On the other hand, if the touch is not cancelled, the process returns to step S2.

In the present embodiment, as described above, when the scroll operation (the operation of moving the touch position after the touch and of thereafter cancelling the touch) is performed on the touch panel portion 11, the liquid crystal display portion 12 (display portion) changes the scroll width at which the list L is scrolled according to the scroll operation direction that is the direction in which the touch position is moved at the time of the scroll operation. In other words, in the present embodiment, when the list L is scrolled, the scroll operation direction (the direction in which the touch position is moved at the time of the scroll operation) is adjusted, and thus it is possible to change the scroll width as necessary. For example, by performing the scroll operation once, it is possible to simultaneously scroll the display range of the list L by a plurality of pages. In this way, even when a significantly large amount of information is present as the display target of the list L, since it is possible to rapidly display the desired information in the list L, this is convenient for the user. Since the scroll width at which the list L is scrolled can be changed only by adjusting the scroll operation direction, the operation is simple and easy to understand.

It should be understood that the embodiment disclosed herein is illustrative in all respects and is not restrictive. The scope of the present disclosure is indicated not by the description of the embodiment discussed above but by the scope of claims; furthermore, meanings equivalent to the scope of claims and all modifications within the scope are included.

What is claimed is:

1. A display input device comprising:
a display portion that displays a list;
a touch panel portion that is provided in the display portion and that detects a touch position touched by a user; and
a processing portion,
wherein, while the display portion displays the list, a scroll operation that is an operation of moving the touch position after the touch of the touch panel portion and of thereafter cancelling the touch of the touch panel portion is performed such that the touch panel portion receives an instruction to scroll the list,
the processing portion determines, when the scroll operation is performed on the touch panel portion, an operation start position where the touch is first performed and an operation completion position where the touch is cancelled, and calculates an inclination angle of the scroll operation direction that is an angle formed by a line extending from the operation start position in a previously determined direction and a line connecting the operation start position and the operation completion position, and
when the scroll operation is performed on the touch panel portion, the display portion changes a scroll width at which the list is scrolled such that the scroll width equals a scroll width associated with an angle range including the inclination angle of the scroll operation direction among a plurality of angle ranges previously determined.

2. A display input device comprising:
a display portion that displays a list;
a touch panel portion that is provided in the display portion and that detects a touch position touched by a user; and
a processing portion,
wherein a total number of display targets listed in the list is variable,
while the display portion displays the list, a scroll operation that is an operation of moving the touch position after the touch of the touch panel portion and of thereafter cancelling the touch of the touch panel portion is performed such that the touch panel portion receives an instruction to scroll the list,
the processing portion determines, when the scroll operation is performed on the touch panel portion, an operation start position where the touch is first performed and an operation completion position where the touch is cancelled, and calculates an inclination angle of the scroll operation direction that is an angle formed by a line extending from the operation start position in a previously determined direction and a line connecting the operation start position and the operation completion position,
the processing portion determines the total number of display targets listed in the list and calculates, based on the total number of display targets listed in the list, scroll widths associated with the previously determined angle ranges, and when the scroll operation is performed on the touch panel portion, the display portion changes a scroll width at which the list is scrolled such that the scroll width equals a scroll width associated with an angle range including the inclination angle of the scroll operation direction among a plurality of angle ranges previously determined.

3. The display input device of claim 1,
wherein the display portion displays guide information which indicates the previously determined angle ranges such that the angle ranges can be visually recognized.

4. The display input device of claim 3,
wherein the guide information is an arrow image.

5. The display input device of claim 1,
wherein the scroll widths associated with the previously determined angle ranges are determined such that, as the inclination angle of the scroll operation direction is increased, the scroll width at which the list is scrolled is increased.

6. A display input device comprising:
a display portion that displays a list; and
a touch panel portion that is provided in the display portion and that detects a touch position touched by a user,
wherein, while the display portion displays the list, a scroll operation that is an operation of moving the touch position after the touch of the touch panel portion and of thereafter cancelling the touch of the touch panel portion is performed such that the touch panel portion receives an instruction to scroll the list,
when an operation is performed of moving the touch position after the touch of the touch panel portion in a previously determined scroll operation reception position within a screen on which the list is displayed and of thereafter cancelling the touch of the touch panel portion, the touch panel portion receives the operation as the scroll operation whereas, when an operation is performed of moving the touch position after the touch of the touch panel portion in a position other than the previously determined scroll operation reception position and of thereafter cancelling the touch of the touch panel portion, the touch panel portion does not receive the operation as the scroll operation, and
when the scroll operation is performed on the touch panel portion, the display portion changes a scroll width at which the list is scrolled according to a scroll operation direction that is a direction in which the touch position is moved at a time of the scroll operation.

7. An image forming apparatus comprising:
the display input device of claim 1.

8. The display input device of claim 1,
wherein the plurality of angle ranges previously determined include at least a first angle range, a second angle range, and a third angle range,
the first angle range is a range between a first line and a second line,
the second angle range is a range between the second line and a third line,
the third angle range is a range between the third line and a fourth line,
the first, second, third, and fourth lines extend in directions different from one another,
an angle formed by the first and second lines, an angle formed by the second and third lines, and an angle formed by the third and fourth lines are equal,
when the inclination angle is included in the first angle range, the scroll width equals a first width, when the inclination angle is included in the second angle range, the scroll width equals a second width, when the inclination angle is included in the third angle range, the scroll width equals a third width, and a difference between the second and first widths differs from a difference between the third and second widths.

\* \* \* \* \*